Apr. 3, 1923.

P. J. CLARKE

PNEUMATIC TIRE CASING

Filed May 11, 1922

1,450,170

Witnesses:

Inventor:
Peter J. Clarke
By Joshua R. H. Potts
His Attorney

Patented Apr. 3, 1923.

1,450,170

UNITED STATES PATENT OFFICE.

PETER J. CLARKE, OF CHICAGO, ILLINOIS.

PNEUMATIC-TIRE CASING.

Application filed May 11, 1922. Serial No. 560,213.

*To all whom it may concern:*

Be it known that I, PETER J. CLARKE, a citizen of the United States, and a resident of the city of Chicago, county of Cook, and State of Illinois, have invented certain new and useful Improvements in Pneumatic-Tire Casings, of which the following is a specification.

This invention relates to pneumatic tire casings, and more particularly to tire casings constructed of puncture proof material, and has for its object the provision of such a casing having its side walls consisting of a plurality of resilient metallic plates, and having a tread portion of resilient material secured between said side walls.

Another object is to provide means for waterproofing the tire by interposing suitable waterproofing material between the metallic plates.

Still another object of the invention is to provide means for fastening a resilient tread member between the metallic side walls of the casing.

Other objects will appear hereinafter.

The invention consists in the combinations and arrangements of parts hereinafter described and claimed.

The invention will be best understood by reference to the accompanying drawings forming a part of this specification and in which, Fig. 1 is a side elevation of the invention;

Figure 1:
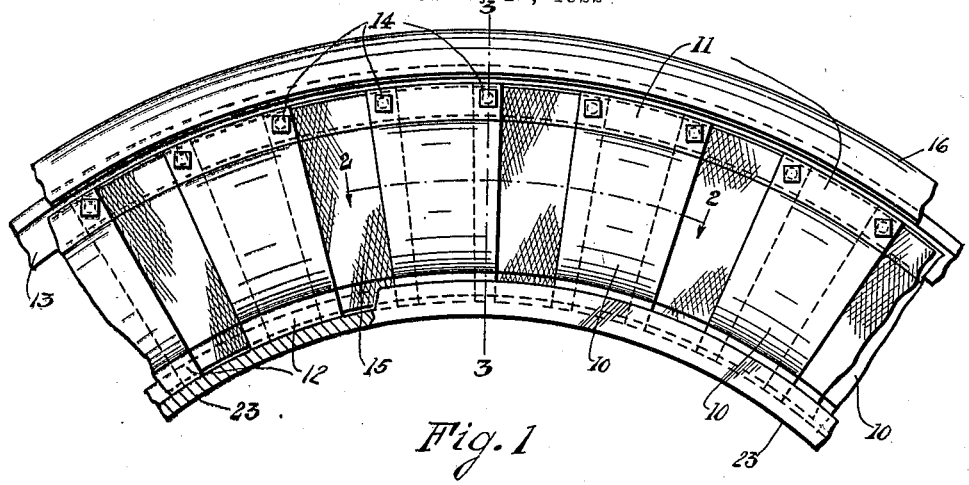

The preferred form of the invention as illustrated in the drawings comprises a plurality of curved plates 10, preferably of spring steel or the like, which may be made up in any suitable sizes, and preferably inwardly tapered as shown. Each of the plates 10 preferably has a curved flange 11 at its outer edge, and at its opposite edge has a somewhat smaller curved flange 12. The plates 10 are preferably disposed in alternately overlapped relation and fastened to suitable frame rings 13, by means of bolts 14, to form the side walls of the casing, as shown in Fig. 1 of the drawings.

Figures 2, 4:
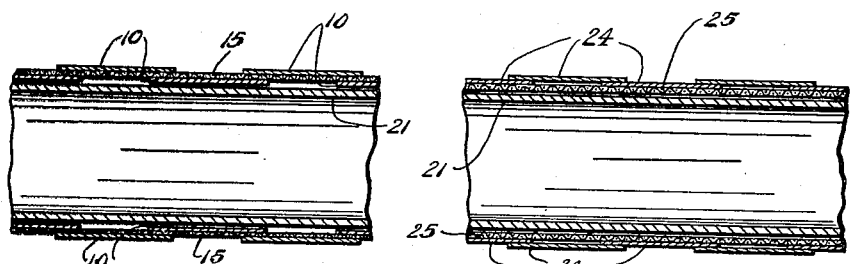
Fig. 2 is a longitudinal sectional view of the invention showing the disposition of the metallic plates, and a flexible material used in connection therewith.
Fig. 4 is a longitudinal sectional view of a modified form of the invention.
Figure 3:
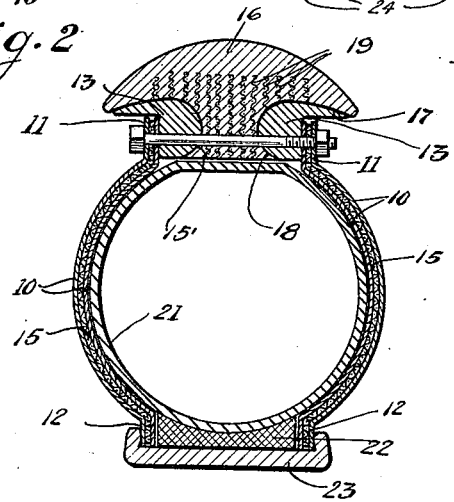
Fig. 3 is a section on the line 3—3 of Fig. 1.

In order to prevent the entry of moisture between the overlapped edges of the plates 10, I preferably utilize a strip of suitable flexible material 15, such as rubberized fabric, and in the preferred form of construction such fabric is in the form of a continuous circumferential strip, which extends alternately beneath one of the plates 10, and over an adjacent plate, as shown in Fig. 2. Such strip 15 may be additionally secured to the plates 10 at their inner edges only, or if desired may be secured to the entire surfaces of the plates by means of cement, or any other suitable securing means.

The rings 13 preferably have their adjacent edges inwardly curved or convex in cross section as shown at 15'. Preferably mounted between the rings 13 is a circumferential resilient tread member 16, preferably of rubber. The member 16 preferably has its sides concaved as shown at 17, the inner periphery thereof being flared as shown at 18. The tread member may be reinforced by circumferential upstanding rows of fabric 19, the layers of fabric being imbedded in the rubber tread member 16. The tread member is held in position by the flared portion 18 projecting between the rings 13, and by means of the bolts 14 which hold said rings, and the plates 10 in position. An inner tube 21 is used to inflate the tire in the ordinary manner and a liner 22 may be disposed adjacent the rim 23 and tube 21 as shown if desired; also a liner (not shown) may be utilized adjacent the underside of the rings 13 and the tread member 16, in a similar manner, these liners of course, being for the purpose of preventing pinching of the inner tube 21.

The modified form of the invention shown in Fig. 4, comprises a plurality of plates 24 like plates 10 which may have the flanges thereof spot-welded together so that a smaller number of bolts like 14 would be necessary to hold the plates in position. Also instead of the fabric 15 extending first over and then under adjacent plates, I provide fabric 25 which is secured wholly within the casing and to bolts like 14 used in connection therewith.

By this arrangement it will be seen that I have provided an extremely cheap and durable construction which is almost impervious to punctures, and which has the desirable properties of a pneumatic tire, with the additional advantage of a long-wearing solid tread portion.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A puncture proof tire casing having separate side walls made up of separate plates; means for holding said plates in operative position; and a circumferential tread member secured between said side walls.

2. A puncture proof tire casing having separate side walls made up of separate plates; means for securing the outer ends of said plates in operative position; and means for closing the crevices between said plates, the inner ends of said plates being connected to said closing means.

3. A puncture proof tire casing comprising separate plates; and means for covering the crevices between said plates, said means consisting of a continuous strip of waterproof material extending over and under successive plates.

4. A puncture proof tire casing comprising separate plates; means for holding the outer ends of said plates in operative position; and means for covering the crevices between said plates, said means consisting of a strip of waterproof material extending over and under successive plates.

5. A puncture proof tire casing comprising separate plates; means for holding the outer ends of said plates in operative position; and means for covering the crevices between said plates, said means consisting of a strip of waterproof material extending over and under successive plates, the inner ends of said plates being connected to said strip of material.

6. A puncture proof tire casing having separate side walls made up of separate plates; means for holding the outer ends of said plates in operative position; means for covering the crevices between said plates, said means consisting of a strip of waterproof material extending over and under successive plates; and a circumferential tread member secured between said side walls.

7. A puncture proof tire casing comprising separate side walls made up of separate plates; means for holding the outer ends of said plates in operative position; means for covering the crevices between said plates, said means consisting of a strip of waterproof material extending over and under successive plates, the inner ends of said plates being connected to said strip of material; and a circumferential tread member secured between said side walls.

8. A puncture proof tire casing having resilient walls made up of separate metallic plates; and means for covering the crevices between said plates, said means consisting of a continuous strip of waterproof material successively extending over and under successive plates.

9. A puncture proof tire casing having separate side walls made up of separate plates; a circumferential tread member adapted to be disposed between the said side walls; and means for holding said plates and said tread member together.

10. A puncture proof tire casing having walls made up of separate plates, said walls having circumferential members connected therewith; and a circumferential tread member having a flared portion adapted to be held between said members.

11. A puncture proof tire casing having side walls, made up of separate plates, said walls having circumferential members connected therewith; and a circumferential tread member adapted to be held between said circumferential members.

12. A puncture proof tire casing comprising circular frames having oppositely disposed lateral circumferential flanges thereon; and a circumferential tread strip secured between said frames and adapted to rest on said flanges.

13. A puncture proof tire casing comprising circular frames having lateral flanges on their outer edges, and having their inner edges convex in cross section and a circumferential tread member having a flared portion adapted to be held by said inner edges.

14. A puncture proof tire casing comprising circular frames having oppositely disposed lateral flanges on their outer edges, a plurality of separate plates secured to said frames to form the side walls of said casing; and a circumferential tread member secured between said frames and adapted to rest on said flanges.

15. A puncture proof tire casing comprising circular frames having lateral flanges on their outer edges, and having their inner edges convex in cross section; a plurality of plates secured to said frames and forming the side walls of said casing; and a circumferential tread member having a flared portion adapted to be held by said inner edges.

16. A puncture proof tire casing comprising circular frames; a plurality of metallic plates secured to said frames; a circumferential tread member held between said frames; and means extending through said frames, plates, and said tread member for holding same in position.

17. A puncture proof tire casing comprising circular frames; a plurality of metallic plates secured to said frames; a strip of waterproof material secured to said plates and adapted to close the crevices therebetween; a circumferential tread member held between said frames; and means extending through said elements for holding same together.

18. A puncture proof tire casing comprising circular frames; a plurality of alternately overlapped metallic plates secured to said frames and a strip of waterproof material secured to and extending over and beneath successive plates; a circumferential tread member held between said frames; and means extending through said elements for holding same together.

19. A puncture proof tire casing comprising circular frames having opposite inwardly divergent inner edges; a plurality of metallic plates secured to said frames; a strip of waterproof material secured to said plates and closing the crevices therebetween; a circumferential tread member having a flared inner portion adapted to engage said inner edges; and means extending through said elements for holding same together.

In testimony whereof I have signed my name to this specification in the presence of two subscribing witnesses.

PETER J. CLARKE.

Witnesses:
 FREDA C. APPLETON,
 MARGARET AUER.